(12) United States Patent
Li et al.

(10) Patent No.: US 11,520,725 B2
(45) Date of Patent: Dec. 6, 2022

(54) PERFORMANCE MONITOR FOR INTERCONNECTION NETWORK IN AN INTEGRATED CIRCUIT

(71) Applicant: NXP USA, Inc., Austin, TX (US)

(72) Inventors: Yuan Li, Austin, TX (US); Xiao Sun, Austin, TX (US)

(73) Assignee: NXP USA, Inc., Austin, TX (US)

( * ) Notice: Subject to any disclaimer, the term of this patent is extended or adjusted under 35 U.S.C. 154(b) by 155 days.

(21) Appl. No.: 16/874,724

(22) Filed: May 15, 2020

(65) Prior Publication Data
US 2021/0357347 A1 Nov. 18, 2021

(51) Int. Cl.
*G06F 13/40* (2006.01)

(52) U.S. Cl.
CPC ........ *G06F 13/4031* (2013.01); *G06F 13/404* (2013.01); *G06F 13/4022* (2013.01)

(58) Field of Classification Search
CPC .. G06F 13/4031; G06F 3/4022; G06F 13/404; G06F 13/4022
See application file for complete search history.

(56) References Cited

U.S. PATENT DOCUMENTS

| | | | |
|---|---|---|---|
| 2003/0115392 A1* | 6/2003 | Fujiwara | G06F 13/364 710/113 |
| 2008/0046603 A1* | 2/2008 | Kobayashi | G06F 11/364 710/17 |
| 2015/0254198 A1* | 9/2015 | Anderson | G06F 13/364 710/110 |
| 2018/0367333 A1* | 12/2018 | Huang | G06F 13/4022 |
| 2019/0116129 A1 | 4/2019 | Wang et al. | |
| 2020/0341934 A1* | 10/2020 | Abdul Kalam | G06F 9/466 |

OTHER PUBLICATIONS

"ArterisIP—FlexNoC 3.9.0 Concepts—Designer's Manual," Qualcomm Interconnect Technology Center, Copyright 2018 Qualcomm Technologies, Inc., Nov. 13, 2018, 60 pages.
S. Furber, "Future Trends in SoC Interconnect," downloaded from https://www.design-reuse.com/articles/14612/future-trends-in-soc-interconnect.html, Mar. 9, 2020, 13 pages.
R. Doost-Mohammady et al., "Performance Analysis of CSMA/CA based Medium Access in Full Duplex Wireless Communications," IEEE Transactions on Mobile Computing, vol. 15, No. 6, Jul. 30, 2015, pp. 1457-1470.
J-J. Lecler et al., "Application driven network-on-chip architecture exploration & refinement for a complex SoC," Des Autom Embed Syst, Arteris, Springer, Mar. 4, 2011, 26 pages.
"AMBA® AXI™ and ACE™ Protocol Specification," Copyright 2011 ARM, 306 pages.

* cited by examiner

*Primary Examiner* — Phong H Dang

(57) ABSTRACT

Channel availability information associated with data traffic between a Master and a Slave within an interconnection network ("ICN") in a System-on-Chip ("SoC") is monitored by a channel performance monitor in order to improve the performance of the ICN. The channel availability information is fed back to certain Masters to control their data traffic into the ICN. The channel performance monitor monitors and evaluates the data traffic handled by switches within the ICN that can potentially interfere with communication paths between particular Masters and Slaves, and control the initiation of data traffic from predetermined Masters.

19 Claims, 9 Drawing Sheets

PERFORMANCE MONITOR FOR INTERCONNECTION NETWORK IN AN INTEGRATED CIRCUIT

TECHNICAL FIELD

The present disclosure relates in general to integrated circuits, and in particular, to communications between logic circuits within an integrated circuit.

BACKGROUND

A System-on-Chip ("SoC") may be designed so that intellectual property blocks ("IPs") communicate with each other over an interconnect system using data transactions. A data transaction is typically an operation of reading or writing one or more bytes of data at one or more addresses in a memory space or register. Data transactions are composed of a request that is sent from an initiator IP (referred to herein as a "Master") to a target IP (referred to herein as a "Slave"), and may contain at least the address and data in the case of a write operation; and a response flowing back from the target to the initiator, with some status information and data in case of a read operation. The physical interface between the IPs and the interconnect system may be sockets, usually synchronous, with a Master side and a Slave side.

Such interconnect systems are often implemented as an on-chip Interconnection Network ("ICN"), also referred to as an "interconnect fabric," or "network-on-chip," which is a network-based communication sub-system in a SoC for connecting multiple Masters ("MM") with multiple Slaves ("MS"). Compared with a traditional bus-based or crossbar-based SoC, a SoC implementing an ICN has attractive advantages such as a flexible and expandable topology that is easy to connect multiple Masters with multiple Slaves in a SoC, supporting parallel and scalable data traffic in a MM-MS topology, improving the scalability and power efficiency of a complex SoC, and supporting improvements in quality of service ("QoS"), which may be configurable in real-time to achieve various desired performance requirements in terms of data traffic throughput and end-to-end latency (referred to herein as its overall efficiency).

However, in performance evaluations of real use cases of SoCs implementing a MM-MS topology, several issues have been discovered. A Master's data traffic (i.e., data flow associated with data transactions) can be significantly degraded when other Masters are simultaneously competing to use the ICN. A particular Master's data traffic can significantly affect the performance of other Masters, especially when the "other Masters" have more time-critical or higher priority data traffic to transfer over the ICN. And, while multiple Masters are accessing a particular Slave, total data traffic throughput via the ICN can be much lower than the bandwidth capacity of this particular Slave.

Such issues are caused by the congestion of data traffic within the ICN due to its complicated topology and associated processes for communicating data traffic, resulting in frequent arbitration, splitting, buffering, rate adaption, and clock-crossing, which degrade the aforementioned advantages and efficiency of the ICN, especially when multiple Masters attempt to simultaneously access multiple Slaves.

The following examples demonstrate how such issues can occur. In the performance evaluations, "efficiency" was defined as a percentage of each Master's data traffic throughput in a multiple Master ("MM") topology as compared with its theoretical data traffic throughput in a single Master ("SM") topology.

In a first example, performance evaluations were conducted on a MM-MS topology to determine the extent of how a Master's data traffic may be significantly degraded when other Masters are competing for data traffic on the ICN. In this example, a couple of Masters, MasterA and MasterB, were evaluated utilizing an ICN to access different Slaves (e.g., memory devices). A performance target for both Masters (MasterA and MasterB) operating in a MM topology was to achieve its designed data traffic throughput as compared to when it operates in a SM topology. The performance evaluations presented the following observations:

in a first test case, only MasterA reading from a first Slave had a data traffic throughput near to its value operating in a SM topology, but the data traffic throughput of both MasterA writing to a third Slave and MasterB writing to a second Slave was degraded by an efficiency of 20%;

in a second test case, when MasterA and MasterB simultaneously wrote to the first Slave and the second Slave, respectively, the throughput of each of them was only able to achieve a 67% in efficiency when compared to operating in a SM topology; and in a third test case, when MasterA and MasterB simultaneously read from the first Slave and the second Slave, respectively, the throughput of each of them was only able to achieve a 52% in efficiency when compared to operating in a SM topology.

The efficiency of the ICN is more significantly degraded when one or a few Masters have a much larger bit width than others, one or a few Masters have a much larger or shorter beat size than others (each transaction is composed of multiple beats, and a Master typically defines the number of beats within a transaction; a transaction with a shorter beat size normally has a shorter latency, while a transaction with larger beat size normally has higher throughput), when more Masters simultaneously generate data traffic to the ICN, and/or the ICN is implemented with a more complicated topology or partition.

In a second example, performance evaluations were conducted to determine whether a Master's data traffic affects other Masters with more time-critical or higher priority data traffic (for example, where MasterA is implemented in a SoC for front-end processing, and MasterB is implemented in a SoC for post-processing. Relative to MasterB, MasterA may have a higher priority in a particular end use application, and thus has a stricter performance requirement (e.g., its data traffic throughput needs to be more than 5 GB/sec, otherwise it cannot complete processing of a required algorithm within a specified duration). Note that both MasterA and MasterB were able to achieve a data traffic throughput much greater than 5 GB/sec when operating in a SM topology.

The performance evaluations demonstrated the following observations:

Regardless of how the configuration of QoS in the ICN was adjusted, it was impossible for the data traffic throughput of MasterA to be greater than 5 GB/sec due to MasterB's data traffic passing through the ICN to access a different Slave.

The cost to increase the data traffic throughput of MasterA was that the data traffic throughput of MasterB became unacceptably low, which also degraded the efficiency of post-processing by MasterB.

The foregoing examples demonstrate a significant performance degradation when a SoC is operating in a multiple-Master ("MM") topology, either from a viewpoint of the throughput of a particular Master, or from a viewpoint of the overall access efficiency of a Slave. This is due to the complex nature of an ICN topology, which introduces data traffic congestion because data flows can experience multiple layers of switches, splitting, buffering, reordering, rate adaption, and clock-crossing.

DETAILED DESCRIPTION

Embodiments of the present disclosure implement a Channel Performance Monitor for an Interconnection Network ("ICN") in order to provide real-time monitoring of data traffic between certain pairs of Masters and Slaves, and then send channel availability information to one or more selected Masters in order to control the starting times of data transactions initiated by each of these Master(s), which may be implemented to achieve better performance and efficiency of data traffic within a SoC, e.g., higher data traffic throughput and/or less end-to-end data transaction latency through the ICN for certain Masters or for all data transactions in the aggregate.

Figure 1:
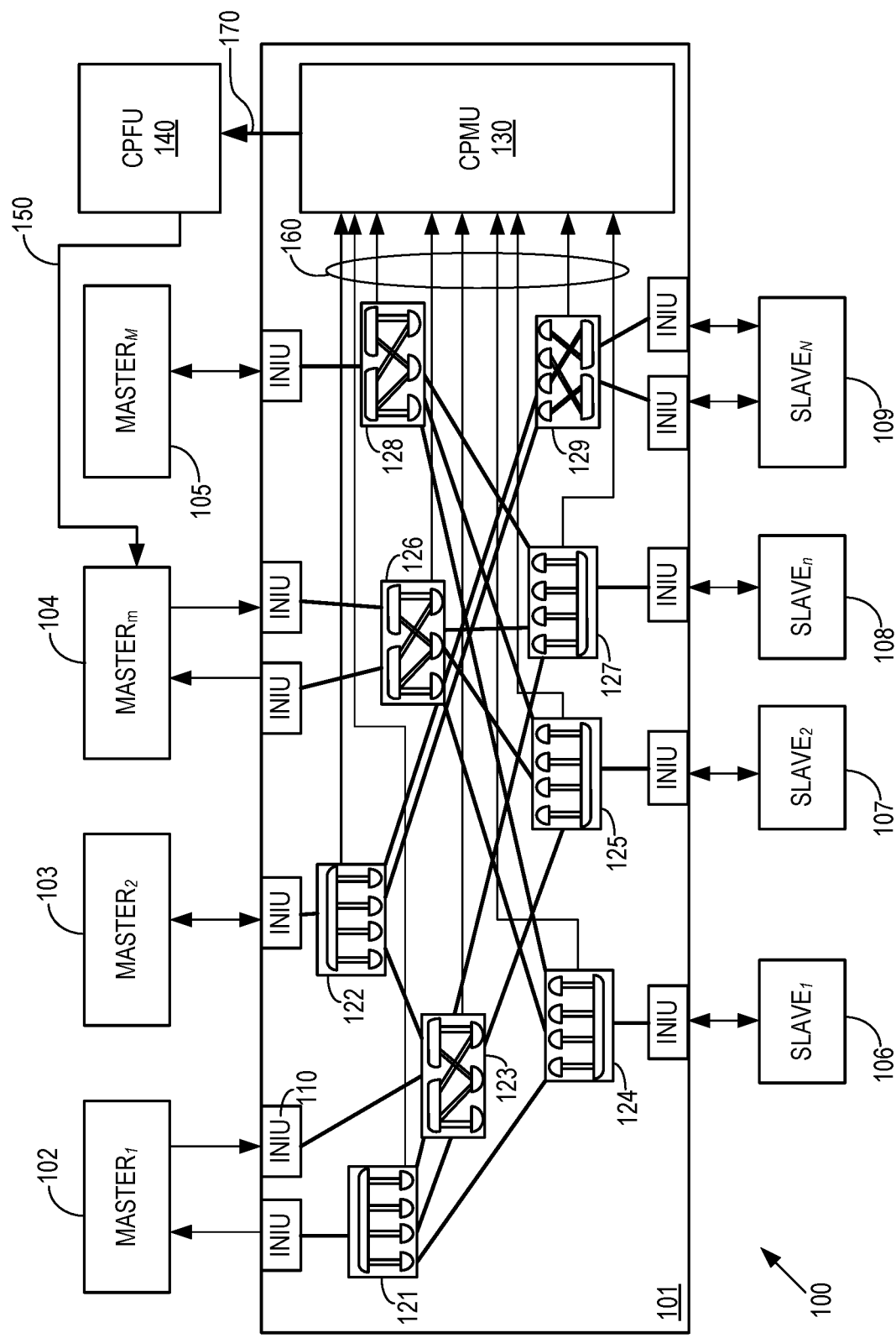
FIG. 1 illustrates a circuit block diagram of an exemplary SoC implemented with an ICN configured in accordance with embodiments of the present disclosure.

FIG. 1 illustrates pertinent portions of an exemplary SoC 100 configured in accordance with embodiments of the present disclosure with an ICN 101, where M Masters and N Slaves (where M≥1 and N≥1) are each coupled to the ICN 101 through an interconnect network interface unit ("INIU") 110 (only one of the INIUs is labelled with "110" for the sake of simplicity) or other type of socket. Masters are circuitry (e.g., IPs) implemented in a SoC that can actively control other circuitry (e.g., other IPs), and/or initiate a data transaction, i.e., read/write data from/to other circuitry (e.g., IPs). Masters include a processor, DSP, hardware accelerator, DMA, etc. For discussion purposes only, the M Masters are represented by the Masters 102 ... 105 illustrated in the exemplary SoC 100. Slaves are circuitry (e.g., IPs) implemented in a SoC that are the target of, i.e., respond to data transaction requests from Masters. For example, a non-limiting list of exemplary Slaves includes memory, dynamic RAM, peripherals, interfaces, etc. For discussion purposes only, the N Slaves are represented by the Slaves 106 ... 109 illustrated in the exemplary SoC 100. Each INIU 110 converts the data transactions from each Master or Slave utilizing one of various well-known protocols into packets for communication through the ICN 101. The ICN hardware may include well-known clock converters, FIFOs, switches, pipeline stages, rate adaptors, etc., not all of which are illustrated in FIG. 1 for the sake of simplicity.

The switches in the ICN 101 (for purposes of discussion only, the exemplary ICN 101 is illustrated with switches 121 ... 129) may be composed of demultiplexers and multiplexers, connected by internal packet transport edges according to a predetermined connectivity map, and may be surrounded by optional pipe stages, serialization adapters, and clock adapters. The clock and serialization of the edges is given by the corresponding switch parameters. In accordance with the predetermined connectivity map, the switches handle routing (e.g., using demultiplexers) and arbitration (e.g., using multiplexers) functions for communication of requests from the Masters 102 ... 105, or handle communication of responses from the Slaves 106 ... 109. FIG. 1 illustrates non-limiting examples of three types of switches: one-input multi-output switches (e.g., see switches 121, 122), multi-input one-output switches (e.g., see switches 124, 125, 127), and multi-input multi-output switches (e.g., see switches 123, 126, 128, 129). There may be multiple layers of such switches within an ICN to implement various complicated data flow topologies.

The following notation will be used in the description of embodiments of the present disclosure. Assume there are P switches in an ICN. For the p-th switch with X inputs and Y outputs, there is a set of one or more pairs of Masters and Slaves (also referred to herein as "(Master, Slave) pairs") to which the p-th switch is coupled for the communication of various data transactions between the Master and the Slave of each such pair, i.e., $\{(M_x^p, S_y^p)|x=1, 2, \ldots, X; y=1, 2, \ldots, Y\}$. Within this notation for each of these (Master, Slave) pairs, $M_x^p$ is mapped to one of M Masters, and $S_y^p$ is mapped to one of N Slaves. For example, in the exemplary embodiment of the ICN 101, if the switch 121 is designated as the first of the P switches, i.e., p=1, then since the switch 121 has one input (X=1) and three outputs (Y=3), the set of (Master, Slave) pairs for the switch 121 would be notated herein as $(M_1^1, S_1^1)$, $(M_1^1, S_2^1)$, $(M_1^1, S_3^1)$.

When the m-th Master accesses the n-th Slave, the associated data transaction passes through Q switches along this (m,n)-th access path in the ICN 101. The set of (Master, Slave) pairs for the (m,n)-th access path is $\{(M_m^q, S_n^q)|q=1, 2, \ldots, Q\}$. Consider an example of the Master 102 (designated in this example as Master$_1$) accessing Slave 107 (designated in this example as Slave$_2$). Such a data transaction would pass through the switches 123 and 125 (Q=2). The set of (Master, Slave) pairs for this access path (i.e., the (1,2)-th access path) would be designated with the notation $(M_1^1, S_2^1)$, $(M_1^2, S_2^2)$.

Embodiments of the present disclosure implement a Channel Performance Monitor ("CPM") for the ICN 101 in order to monitor a current activity level of certain data transactions associated with one or more certain (Master, Slave) pairs, and then send a channel availability signal to one or more Masters of Interest in order to control the starting times for the initiation of their respective data transactions. In accordance with embodiments of the present disclosure, monitoring of a current activity level refers to the monitoring of data transactions in real-time. In accordance with embodiments of the present disclosure, the CPM implemented within a SoC may include a Channel Performance Monitoring Unit ("CPMU") for each ICN within the SoC in combination with a Channel Performance Fusion Unit ("CPFU"). In the exemplary embodiment of FIG. 1, the CPM includes the CPMU 130 and the CPFU 140. As will be further described with respect to FIG. 2, there may be a CPMU implemented for each ICN within a SoC.

As utilized in the description of embodiments of the present disclosure, the CPM is configured to monitor certain data transactions between a Master$_m$ and a Slave$_n$ referred to herein as the (Master, Slave) Pair of Interest. These certain data transactions are those handled by the Q switches within the previously described (m,n)-th access path. The "Footprint (m, n) of Interest" refers to these Q switches. More specifically, the certain data transactions monitored by the CPM are the read and/or write request (also abbreviated herein as "RD/WR_REQ") signals associated with these data transactions that are handled by the switches that are within the Footprint (m, n) of Interest, i.e., all of the Q switches that handle the (m,n)-th access path between an m-th Master and an n-th Slave of the (Master, Slave) Pair of Interest. The term "read and/or write request" may also be referred to herein as "read/write request," and more generally as a "data transfer request." In the particular non-limiting example described with respect to FIG. 1, the m-th Master (Master$_m$) is the Master 104, and the n-th Slave (Slave$_n$) is the Slave 108, and the (m,n)-th access path between the Master 104 and the Slave 108 is composed of the Q switches 126 and 127. Thus, the switches 126 and 127 are within the exemplary Footprint (m, n) of Interest.

More specifically, the certain data transactions that the CPMU 130 receives from each of the switches within a Footprint (m, n) of Interest are the RD/WR_REQ signals associated with all of the (Master, Slave) pairs that could potentially interfere with the Footprint data traffic, i.e., data traffic between the m-th Master and the n-th Slave (i.e., the (Master, Slave) Pair of Interest). In other words, the ICN 101 is configured so that the CPMU 130 receives from each of these switches the RD/WR_REQ signals associated with all of the interfering (Master, Slave) pairs handled by the switch, i.e., excluding the RD/WR_REQ signals associated with the data transactions between the m-th Master and the n-th Slave (i.e., the CPM is not configured to monitor the read and/or write requests handled by the switches for communicating data transactions between the m-th Master and the n-th Slave). Such RD/WR_REQ signals may also be referred to herein as the "Interfering RD/WR_REQ signals."

As can be readily appreciated, since embodiments of the present disclosure may be concerned with how data traffic between a particular Master and Slave (i.e., between the m-th Master and the n-th Slave of a (Master, Slave) Pair of Interest) may be affected by, or may affect, other data traffic within the ICN, it is those potentially interfering read and/or write requests (i.e., the Interfering RD/WR_REQ signals pertaining to such requests) handled by the switches within the Footprint (m, n) of Interest for other (Master, Slave) pairs that are monitored on a real-time basis and evaluated by the CPM.

As will be further described herein, the CPM performs a real-time monitoring and evaluation of the Interfering RD/WR_REQ signals to determine when to send channel availability signals to one or more predetermined Masters that the SoC designer or architect has predetermined, or is dynamically selected by software running in the SoC, to receive the channel availability signals (referred to herein as the "Master(s) of Interest"). In accordance with embodiments of the present disclosure, the Master of Interest may be the Master$_m$ of the (Master, Slave) Pair of Interest. The Master of Interest (Master$_m$) for the exemplary embodiment in FIG. 1 is the Master 104 receiving the channel availability signal 150, though embodiments of the present disclosure are not limited to the CPM only sending a channel availability signal to the m-th Master directly associated with the (m,n)-th access path between the Master$_m$ and the Slave$_n$, but may also send channel availability signals to one or more other Masters that are not directly associated with the (m,n)-th access path (e.g., any one or more of the Masters 102, 103, . . . 105).

Note that embodiments of the present disclosure may be utilized to monitor the data transactions handled by switches within more than one footprint through an ICN, and thus may send channel availability signals to a plurality of Masters of Interest in order to control the starting times of their respective data transactions. For example, for another Footprint (m', n') of Interest in which the Master$_2$ (e.g., the Master 103) is Master$_{m'}$ and the Slave$_N$ (e.g., the Slave 109) is Slave$_{n'}$, the Footprint (m', n') of Interest could be designated as the Footprint (2, N) of Interest. In such an example, the Master of Interest receiving the channel availability signals may be designated (predetermined) to be the Master$_{m'}$ (e.g., the Master 103 would be coupled to the CPFU 140 by a signal line 150).

For example, referring to FIG. 1, assume that the designer of the integrated circuit 100 determined that the data transactions between the Master 104 and the Slave 108 need to be controlled. In this particular example, the Master 104 and the Slave 108 are designated as the (Master, Slave) Pair of Interest, and the Master 104 is thus designated as the Master of Interest. For example, the designer may have designed the SoC 100 so that when data traffic between the Master 104 and the Slave 108 occurs, other data traffic within the ICN 101 that might interfere with these data transactions should be minimized, or at least decreased. Or, the designer may have designed the SoC 100 so that one or more of the switches within the Footprint (m, n) of Interest (for this example, the switches 126, 127) need to be more frequently available to handle the data traffic between one or more of the other Masters (e.g., Masters 102, 103, or 105) and one or more of the other Slaves (e.g., Slaves 106, 107, or 109), since such data traffic is of a higher priority than the data traffic between the Master 104 and the Slave 108. Consequently, for this particular example, the CPM can be configured to monitor a current activity level of the data transactions communicated by the switches 126 and 127 (i.e., a real-time monitoring of the Interfering RD/WR_REQ signals), and thereby control the initiation of data transactions (via a channel availability signal) by the Master of Interest, i.e., the Master 104.

Assume, for example, the switch 126 has two inputs from a Master (i.e., X=2) and three outputs that eventually are sent to a Slave (i.e., Y=3), while the switch 127 has three inputs that it communicates from a Master (i.e., X=3) and one output to a Slave (i.e., Y=1). Further assume that the ICN 101 has nine switches (i.e., P=9), and the switch 126 is designated as the sixth switch (i.e., p=6) while the switch 127 is designated as the seventh switch (i.e., p=7). In accordance with the previously described notation, the RD/WR_REQ signals associated with the following (Master, Slave) pairs are sent to the CPMU 130: $(M_1^6, S_1^6)$, $(M_1^6, S_2^6)$, $(M_2^6, S_1^6)$, $(M_2^6, S_2^6)$ pertaining to the switch 126, and $(M_1^7, S_1^7)$, $(M_3^7, S_1^7)$ pertaining to the switch 127. Since they are associated with the data traffic between the Master 104 and the Slave 108, the RD/WR_REQ signals associated with the following (Master, Slave) pairs are not sent to the CPMU 130: $(M_1^6, S_3^6)$, $(M_2^6, S_3^6)$ pertaining to the switch 126, and $(M_2^7, S_1^7)$ pertaining to the switch 127.

Therefore, the RD/WR_REQ signals associated with the (Master, Slave) pairs $(M_1^6,S_1^6)$, $(M_1^6,S_2^6)$, $(M_2^6,S_1^6)$, $(M_2^6, S_2^6)$, $(M_1^7,S_1^7)$, $(M_3^7,S_1^7)$ are the Interfering RD/WR_REQ signals.

Note, in accordance with embodiments of the present disclosure, though signal lines 160 are shown as being coupled to the CPMU 130 from each of the switches 121 . . . 129, the ICN 101 may be configured so that only the signal lines from the switches within the Footprint (m, n) of Interest are hardwired to the CPMU 130 (or activated within the CPMU 130 if there are signal lines 160 coupled between all of the switches and the CPMU 130), since the Master(s) of Interest may be predetermined during design of the integrated circuit 100. For example, the signal lines 160 may be configured to link the Read and Write request signals (i.e., the Interfering RD/WR_REQ signals) received by a particular switch to the CPMU 130, so that the CPMU 130 is capable of "sensing" the current (i.e., real-time) values of these signals. Alternatively, the CPMU 130 may be configured to be capable of dynamically selective of which of the signal lines 160 from the switches 121 . . . 129 to activate for an implementation in which the Master(s) of Interest may be selectively changed. When describing embodiments of the present disclosure herein, the receipt of the Interfering RD/WR_REQ signals by a CPMU refers to such a linking or sensing of such signals, which may be performed by logic circuits in a manner well-known in the art.

Figure 2:
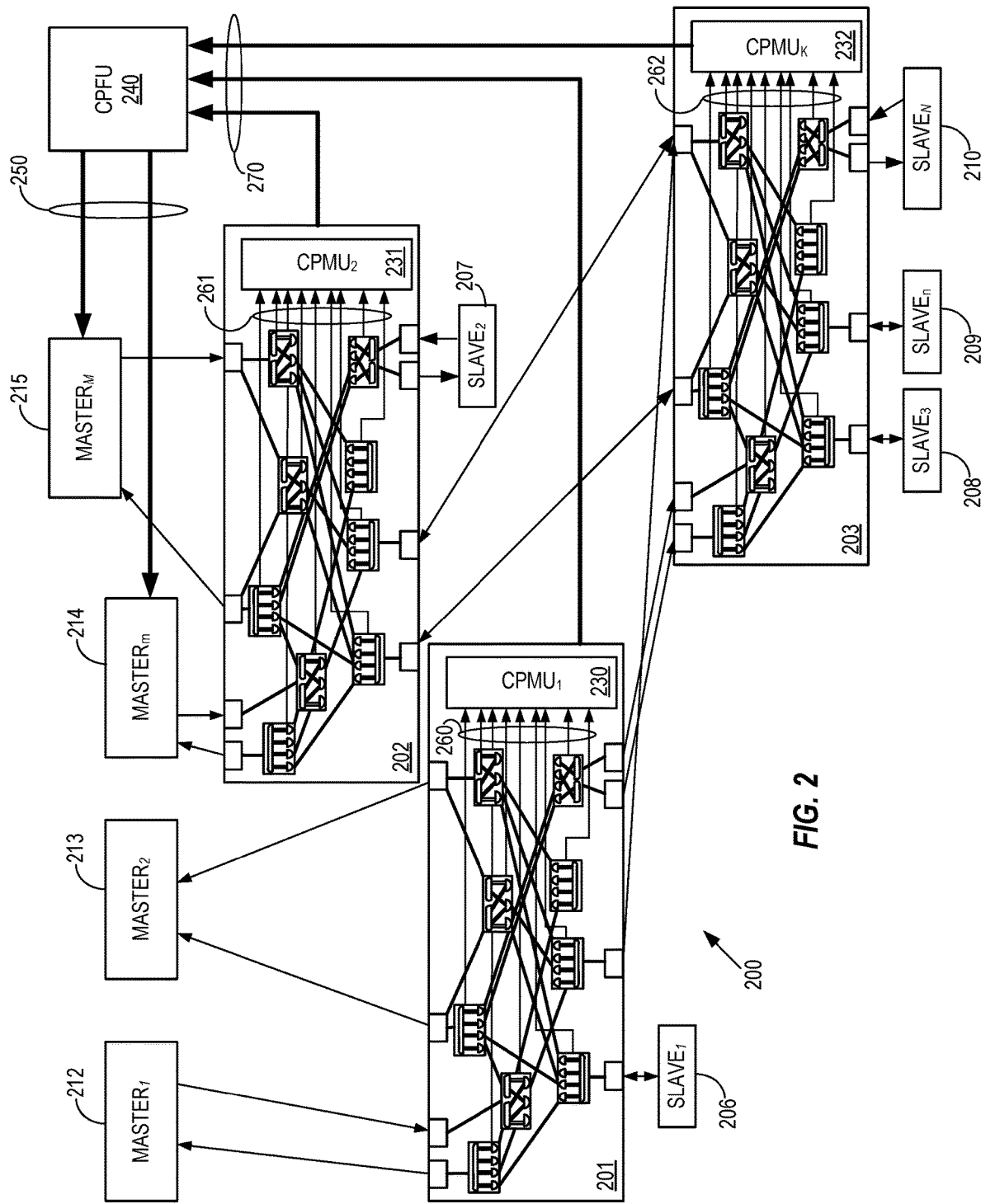
FIG. 2 illustrates a circuit block diagram of an exemplary SoC implemented with multiple ICNs configured in accordance with embodiments of the present disclosure.
Figure 3:
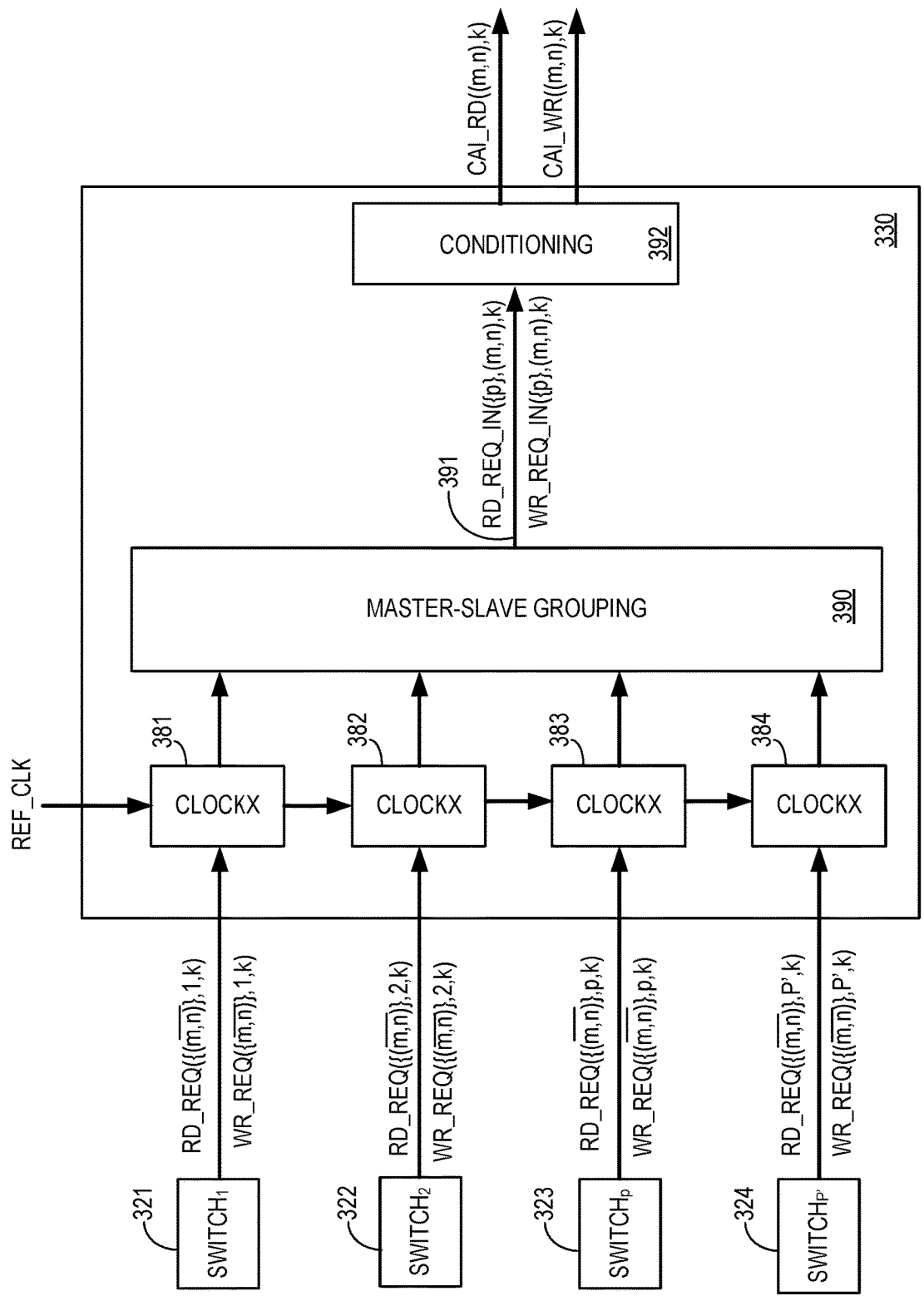
FIG. 3 illustrates a circuit block diagram of a Channel Performance Monitoring Unit configured in accordance with embodiments of the present disclosure.

As will be further described with respect to FIG. 3, the CPMU 130 may convert the received Interfering RD/WR_REQ signals into a common clock domain, and then group them into different clusters, wherein each cluster corresponds to a different (Master, Slave) Pair of Interest. The CPMU 130 then conditions the Interfering RD/WR_REQ signals into channel availability indication ("CAI") signals, which are output 170 from the CPMU 130 as CAI_RD/WR signals and sent to the CPFU 140 (i.e., output from the CPMU 130 are CAI_RD signals corresponding to the monitoring of Interfering RD_REQ signals and CAI_WR signals corresponding to the monitoring of Interfering WR_REQ signals). The CAI_RD/WR signals are clustered by (Master, Slave) Pair(s) of Interest from all the one or more ICNs implemented in a SoC, which will become more apparent with respect to the description of FIG. 2.

Figure 7:
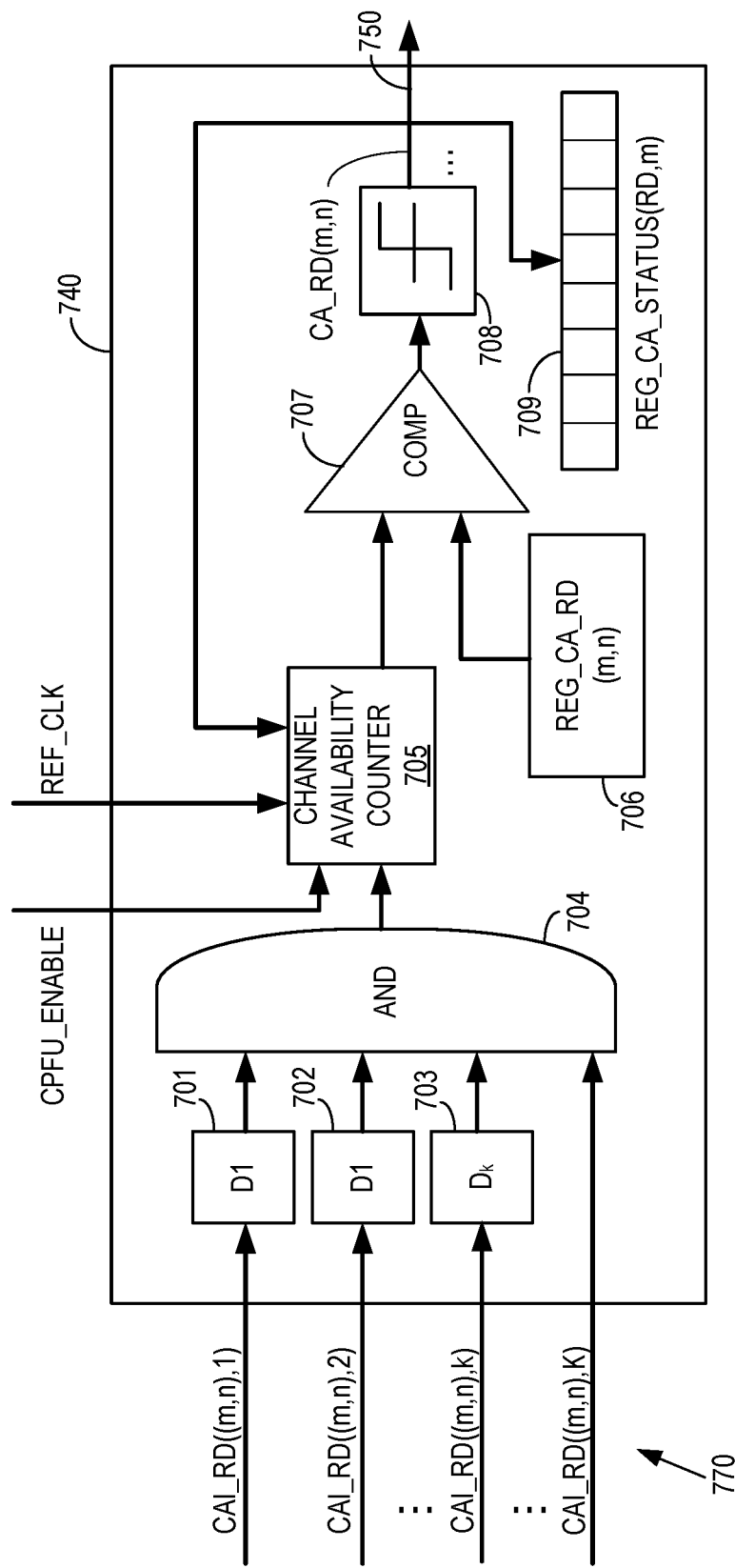
FIG. 7 illustrates a circuit block diagram of a Channel Performance Fusion Unit configured in accordance with embodiments of the present disclosure.

As will be further described with respect to FIG. 7, the CPFU 140 conditions and combines these CAI_RD/WR signals, and continuously counts a number of cycles that the Footprint (m, n) of Interest is available (i.e., continuous cycles when all of the switches within the footprint of (m, n) are not handling data traffic from Interfering (Master, Slave) pairs). If the counted number is greater than a predetermined threshold, the resulting control signal (the channel availability signal) is asserted and output 150 to the predetermined Master(s) of Interest (which in the exemplary embodiment illustrated in FIG. 1 is the Master 104). The threshold may be predetermined to ensure that all data traffic from Interfering (Master, Slave) pairs (i.e., the Interfering Read and Write requests) have completed their transactions. For example, the threshold may be predetermined to be of a particular value since it may be known that certain data transactions between certain (Master, Slave) pairs can have a delay between multiple Read or Write requests.

FIG. 2 illustrates a non-limiting exemplary embodiment of the present disclosure in which a SoC 200 includes K (where K≥1) ICNs coupling M Masters 212 . . . 215 to N Slaves 206 . . . 210. In this particular example, the SoC 200 contains ICNs 201 . . . 203, though any number K of ICNs may be handled in accordance with embodiments of the present disclosure. Note that though the illustrated ICNs 201 . . . 203 are depicted in FIG. 2 with similar topologies, this is merely for the sake of simplicity, and each of the K ICNs in a SoC may have its own unique predetermined topology. Furthermore, the particular configuration in FIG. 2 of the M Masters 212 . . . 215 and N Slaves 206 . . . 210 coupled to the K ICNs 201 . . . 203 is merely exemplary.

Each of the K ICNs (e.g., the ICNs 201 . . . 203) includes a CPMU (e.g., the CPMUs 230 . . . 232, respectively). Thus, there are K CPMUs in the SoC 200. The input, output, and functionality of each of the K CPMUs are as similarly described with respect to the CPMU 130 of FIG. 1.

In accordance with embodiments of the present disclosure, the SoC 200 includes a CPFU 240, which receives inputs 270 from each of the K CPMUs 230 . . . 232. The input, output, and functionality of the CPFU 240 are as similarly described with respect to the CPFU 140 of FIG. 1.

Embodiments of the present disclosure are configured to monitor the Interfering RD/WR_REQ signals within one or more Footprints (m, n) of Interest and evaluate such signals to control the initiation of data traffic (i.e., Read and/or Write data transactions) from the predetermined Master(s) of Interest. In this particular non-limiting example, the Masters of Interest are the Master 214 and the Master 215 receiving channel availability signals 250 from the CPFU 240. Taking into account the general notation previously described, in each ICN that includes switches within the Footprint (m, n) of Interest (i.e., the switches along the (m,n)-th access path between the m-th Master and the n-th Slave), the CPMU will monitor the Interfering RD/WR_REQ signals, cluster the signals on a per Footprint (m, n) of Interest basis, and forward the clusters to the CPFU 240 for evaluation.

For example, for Master$_m$ 214 to access Slave$_n$ 209, the (m,n)-th access path for the data transaction may pass through the ICN 202 and the ICN 203. Since the specific switches within the ICN 202 and the ICN 203 are not identified for the sake of simplicity, the Footprint (m, n) of Interest includes one or more switches in the ICN 202 and one or more switches in the ICN 203. It is the data transactions handled by these switches for (Master, Slave) pairs other than data traffic for the (Master$_m$, Slave$_n$) pair (e.g., between the Master 214 and the Slave 209 in the illustrated example of FIG. 2) that are monitored by the CPM (i.e., the Interfering RD/WR_REQ signals).

For example, the CPMU 231 may be configured to monitor the Interfering RD/WR_REQ signals within the switches in the ICN 202 that are within the Footprint (m, n) of Interest, and the CPMU 232 may be configured to monitor the Interfering RD/WR_REQ signals within the switches in the ICN 203 that are within the Footprint (m, n) of Interest. The CPFU 240 will then receive the outputs from the CPMU 231 and the CPMU 232 and evaluate them to produce the channel availability signals, which may be sent to one or more predetermined Masters of Interest (e.g., the Master 214).

Likewise, the SoC 200 may be configured to have a second Footprint (m, n) of Interest, for example the (M,N)-th access path between the Master$_M$ and the Slave$_N$ (in this example, the Master 215 and the Slave 210). In this example, the CPMU 231 may be configured to monitor the Interfering RD/WR_REQ signals within the switches in the ICN 202 that are within the Footprint (M, N) of Interest, and the CPMU 232 may be configured to monitor the Interfering RD/WR_REQ signals within the switches in the ICN 203 that are within the Footprint (M, N) of Interest. The CPFU 240 will then receive the outputs from the CPMU 231 and the CPMU 232 and evaluate them to produce the channel availability signals, which may be sent to one or more predetermined Masters of Interest (e.g., the Master 215). FIG. 3 illustrates a block diagram of a CPMU 330 implemented in each k-th ICN in an SoC. The CPMU 330 is representative of the CPMU 130 in the SoC 100, and the K CPMUs 230 . . . 232 in the SoC 200. The circuitry implemented in the CPMU 330 allows simultaneous monitoring of Interfering RD/WR_REQ signals between Interfering (Master, Slave) pairs in a single ICN.

The CPMU 330 includes a Master-Slave grouping logic block 390 and a conditioning logic block 392, and may include multiple clock-crossing logic blocks 381 . . . 384.

Assume again under the previously described notation that the (m,n)-th access path between the $\text{Master}_m$ and the $\text{Slave}_n$ (i.e., the (Master, Slave) Pair of Interest) is the Footprint (m, n) of Interest, and that the $\text{Master}_m$ is designated as the Master of Interest.

In FIG. 3, there are P' switches (P'≤P) in the k-th ICN that are within the Footprint (m, n) of Interest, in which $\text{Switch}_p$ routes data traffic for a set of Interfering (Master, Slave) pairs, noted herein as $\{\overline{(m,n)}\}=\{(M_x^p, S_y^p)|x=1, 2, \ldots, X-1; y=1, 2, \ldots, Y-1\}$, i.e., all of the (Master, Slave) pairs except the (Master, Slave) pair (m, n).

Thus, the notation RD/WR_REQ($\{\overline{(m,n)}\}$, p, k) refers to the Interfering RD/WR_REQ signals received from the p-th switch ($\text{Switch}_p$) from all Interfering (Master, Slave) pairs (i.e., excluding the RD/WR_REQ signals associated with the (Master, Slave) pair (m, n) in the k-th ICN, as input to the CPMU 330.

In the exemplary embodiment illustrated in FIG. 1, the P' switches 321 . . . 324 represent the switches 126 and 127 in the ICN 101, since they are within the Footprint (m, n) of Interest. In the exemplary embodiment illustrated in FIG. 2, the P' switches 321 . . . 324 represent the switches in each of the ICNs 202 and 203, since they contain switches with the Footprint (m, n) of Interest (and in this non-limiting exemplary embodiment, the ICN 201 does not contain any switches within the Footprint (m, n) of Interest handling data traffic between the m-th Master ($\text{Master}_m$) and the n-th Slave ($\text{Slave}_n$)).

The CPMU 330 output is sent to the CPFU. In the exemplary embodiment illustrated in FIG. 1, the output 170 would be sent to the CPFU 140. In the exemplary embodiment illustrated in FIG. 2, the outputs 270 from each of the K CPMUs 231 and 232 would be sent to the CPFU 240.

Because the Read and Write request signals may have been generated by different Masters with different clock domains, before further processing within the CPMU 330, they may be converted to a common clock domain (e.g., as determined from a received reference clock (designated as "REF_CLK")), which can be performed in a well-known manner by the P' clock-crossing logic blocks 381 . . . 384. In accordance with certain embodiments of the present disclosure, conversion of the monitored Read and Write request signals to a common clock domain permits the CPMU 330 to output a signal that represents an aggregate of a level of the real-time activity of the Read/Write request signals handled by the switches 321 . . . 324.

Note that, for the sake of simplicity, the notation used in FIG. 3 represents the processing by the CPMU 330 of Interfering RD/WR_REQ signals received from the switches within the Footprint (m, n) of Interest (in the k-th ICN) associated with a (Master, Slave) Pair of Interest. However, when there are more than one (Master, Slave) Pairs of Interest, the CPMU 330 will be receiving the Interfering RD/WR_REQ signals from all of the switches that are within each of these different Footprint (m, n) of Interest, where the P' switches represent all of such switches in the k-th ICN.

The CPMU 330 groups the Interfering RD/WR_REQ signals into separate clusters each corresponding to a different (Master, Slave) Pair of Interest; and then conditions them into channel availability indication ("CAI") signals by the conditioning logic block 392.

Utilizing multiplexer circuitry in a well-known manner within the Master-Slave Grouping logic block 390, the Interfering RD/WR_REQ signals are grouped on a per Footprint (m, n) of Interest basis into individual Read and Write clusters, wherein each Read and Write cluster contains signals for a (Master, Slave) Pair of Interest. For example, the RD_REQ_IN({p},(m,n),k) cluster 391 contains all Interfering RD_REQ signals from all of the p switches within a particular Footprint (m, n) of Interest in the k-th ICN, while the WR_REQ_IN({p},(m,n),k) cluster 391 contains all Interfering WR_REQ signals from all of the p switches within a particular Footprint (m, n) of Interest in the k-th ICN. The Master-Slave Grouping logic block 390 is further described with respect to FIG. 4.

The conditioning logic block 392 may compensate for delays in receiving Interfering RD/WR_REQ signals from different switches, and generate a CAI Read signal, CAI_RD ((m,n),k), and a CAI Write signal, CAI_WR((m,n),k), which are generally referred to herein as the CAI_RD/WR signals. The conditioning logic block 392 is further described with respect to FIG. 5. The CAI_RD/WR signals output from the CPMU 330 for each of the one or more (Master, Slave) Pairs of Interest from the k-th ICN are sent to the CPFU (e.g., the CPFU 140, 240).

Figure 4:
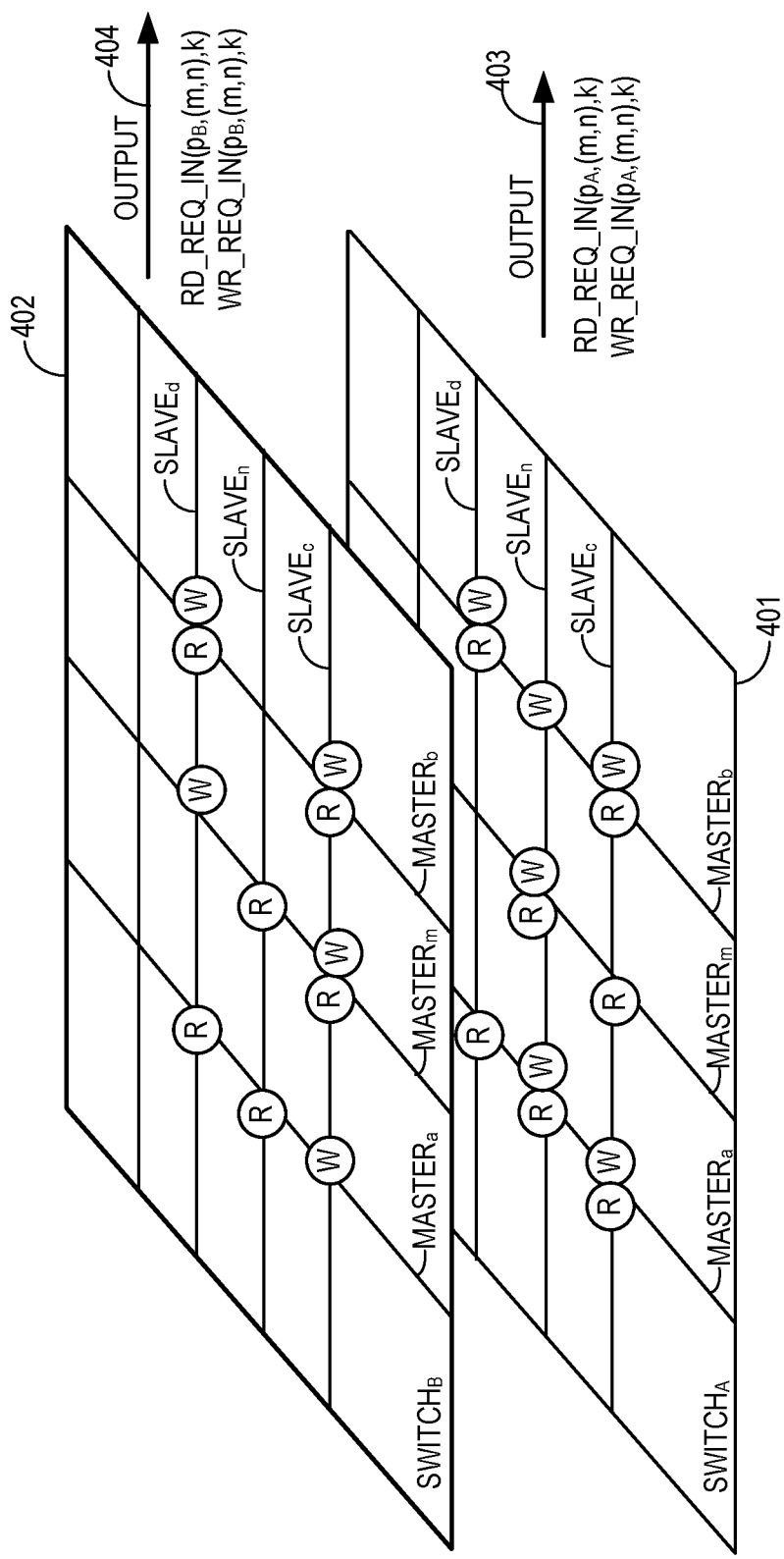
FIG. 4 illustrates schematic diagram showing an example of Master-Slave grouping within a Channel Performance Monitoring Unit.

FIG. 4 illustrates a diagram representing an example of operations performed by the master-slave grouping logic block 390. The Master-Slave grouping logic block 390 may be configured with any combinatorial logic circuitry suitable for performing the clustering of the Read/Write request signals as described herein and in accordance with the example described with respect to FIG. 4.

Though a CPMU 330 may be configured to group or cluster the Interfering RD/WR_REQ signals for multiple (Master, Slave) Pairs of Interest, for the sake of simplicity, FIG. 4 illustrates the Master-Slave grouping performed in the Master-Slave grouping logic block 390 for one (Master, Slave) Pair of Interest. Assume two switches, $\text{Switch}_A$ 401 and $\text{Switch}_B$ 402, each of which route data transaction paths from Master:{m,a,b} to Slave:{n,c,d}. The $\text{Switch}_A$ 401 and $\text{Switch}_B$ 402 are an exemplary representation of at least two switches within a Footprint (m, n) of Interest in a k-th ICN. The depiction of the $\text{Switch}_k$ 401 in FIG. 4 shows a non-limiting example of all of the Read and Write requests handled by this switch within the k-th ICN, and the depiction of the $\text{Switch}_B$ 402 shows a non-limiting example of all of the Read and Write requests handled by this switch within the k-th ICN. Note that the example illustrated in FIG. 4 shows Read and Write requests handled by the $\text{Switch}_k$ 401 and a Read request handled by the $\text{Switch}_B$ 402 between the $\text{Master}_m$ and the $\text{Slave}_n$, even though these particular Read and Write requests would not be received by the CPMU 330 since they are associated with data transactions between the $\text{Master}_m$ and the $\text{Slave}_n$. These are shown in FIG. 4 merely to assist in the description of functions performed by the Master-Slave grouping logic block 390.

On the master side, the $\text{Switch}_k$ 401 maps to not only the m-th Master (i.e., the Master of Interest), but also the a-th . . . b-th Masters; on the slave side, the $\text{Switch}_k$ 401 maps to not only the n-th Slave, but also the c-th . . . d-th Slaves, and likewise with respect to the Switch$_B$ 402. Thus, the a-th . . . b-th Masters and the c-th . . . d-th Slaves represent the Interfering (Master, Slave) pairs, i.e., the (Master, Slave) pairs that are responsible for the Interfering RD/WR_REQ signals.

Each illustrated node in FIG. 4 that has an "R" or "W" label represents either a Read Path (designated with the "R") or a Write Path (designated with the "W"), or both. For example, the node designated with the "R" at the intersection of Master$_m$ and Slave$_c$ in the Switch$_A$ 401 represents a Read data transaction passing through the Switch$_k$ 401 in which the Master$_m$ has sent a Read request ("RD_REQ") to the Slave$_c$, which may be represented herein as RD_REQ (p$_A$,(m,c),k). As previously noted with respect to FIG. 3, the Master-Slave grouping logic block 390 is configured to receive all of the Interfering Read and Write requests handled by the switches that are within the Footprint (m, n) of Interest (i.e., excluding any Read and Write requests between the Master$_m$ and Slave$_n$), and to then group them into clusters.

Consequently, with respect to the Footprint (m, n) of Interest, RD_REQ_IN(p$_A$,(m,n),k) represents a cluster of Interfering RD_REQ signals (i.e., excluding RD_REQ(m,n) signals) handled by the p-th switch in the k-th ICN. For example, as illustrated in FIG. 4, for Switch$_A$ 401, the clustered signal RD_REQ_IN(p$_A$,(m,n),k) is a combination of RD_REQ(p$_A$,(a,c),k), RD_REQ(p$_A$,(a,n),k), RD_REQ (p$_A$,(a,d),k), RD_REQ(p$_A$,(b,c),k), and RD_REQ(p$_A$, (b,d),k).

And likewise, the clustered signal WR_REQ_IN(p$_A$, (m,n),k) is a combination of WR_REQ(p$_A$,(a,c),k), WR_REQ(p$_A$,(a,n),k), WR_REQ(p$_A$,(b,c),k), WR_REQ(p$_A$, (b,n),k), and WR_REQ(p$_A$,(b,d),k).

The clustered signal RD_REQ_IN(p$_B$,(m,n),k) is a combination of RD_REQ(p$_B$,(a,n),k), RD_REQ(p$_B$,(a,d),k), RD_REQ(p$_B$,(m,c),k), RD_REQ(p$_B$,(b,c),k), and RD_REQ (p$_B$,(b,d),k).

Note that WR_REQ_IN(p$_B$,(m,n),k) may not be produced by the master-slave grouping logic block 390 for this particular example because there is no WR_REQ(m,n) handled by the Switch$_B$ 402 in the k-th ICN. In other words, since a Write request between the Master$_m$ and the Slave$_n$ is not handled by the Switch$_B$ 402, embodiments of the present disclosure can be configured to not monitor Interfering Write requests handled by this particular switch. Thus, even though FIG. 4 shows a notation of WR_REQ(p$_B$,(m,n),k) for the output 404, embodiments of the present disclosure can be configured so that an output of WR_REQ(p$_B$,(m,n),k) would not be sent.

Figure 5:
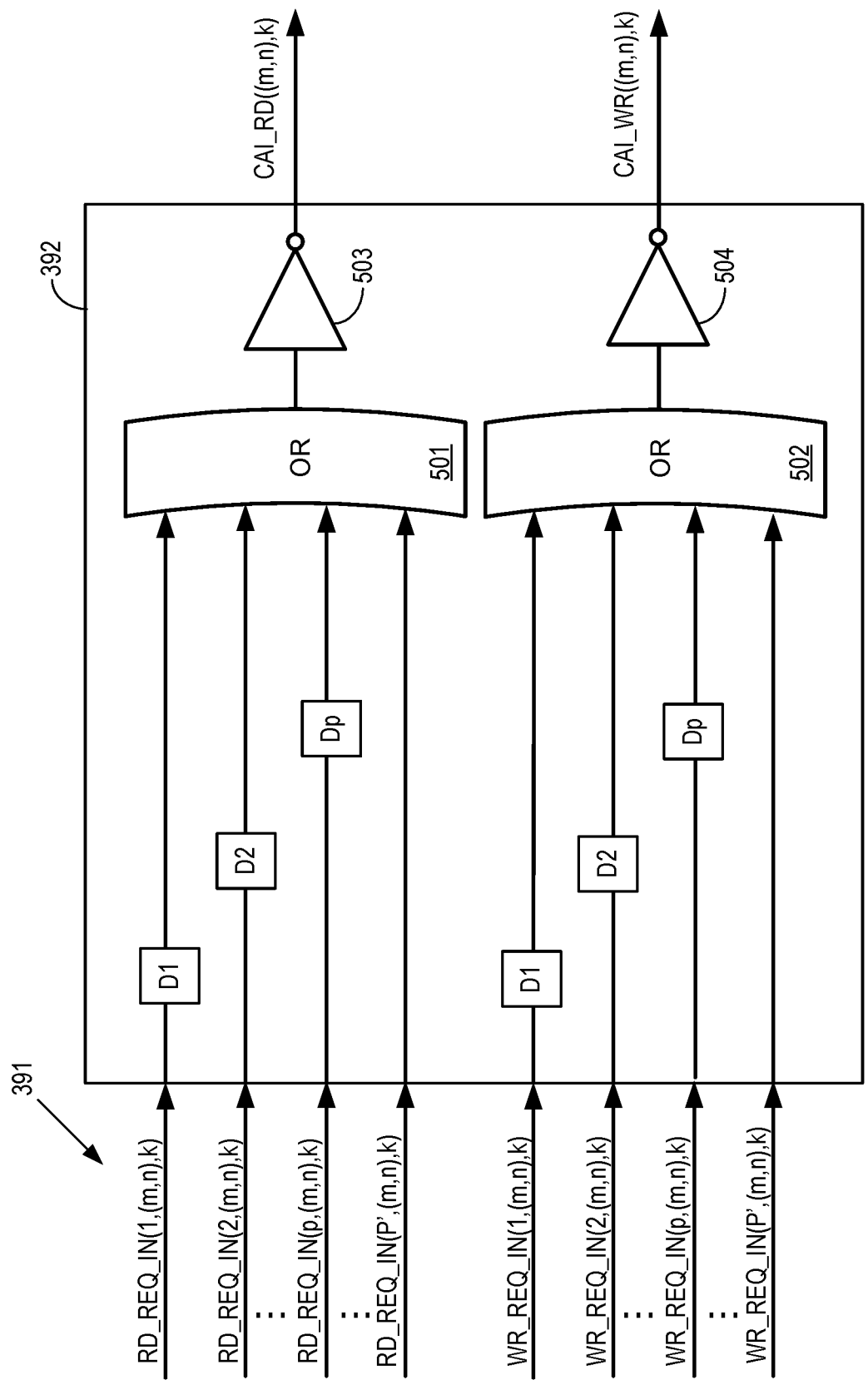
FIG. 5 illustrates a circuit block diagram of a conditioning block within a Channel Performance Monitoring Unit.

FIG. 5 illustrates logic circuitry for the conditioning logic block 392, which performs a logic OR operation on all of the clustered Interfering RD_REQ signals from each of the P' switches in the k-th ICN, and likewise with respect to the clustered Interfering WR_REQ signals, to produce the channel availability indication ("CAI") signals for each, i.e., the CAI_RD((m,n),k) and CAI_WR((m,n),k) signals. All of the Interfering Read request signals from each switch p within the Footprint (m, n) of Interest in the k-th ICN are received by the logic OR gate 501, and all of the Interfering Write request signals from each switch p within the Footprint (m, n) of Interest in the k-th ICN are received by the logic OR gate 502. Each of the signals output from the logic OR gates 501, 502 may be inverted by the logic NOT gates 503, 504, respectively. Since the different switches may be positioned in the layout of the ICN different lengths from the CPMU, different delays may be added to the incoming signals to properly synchronize them. Assume Switch$_{P'}$ is the last one in the pipeline. As a result, Read or Write request signals from other switches need to add different delays in order to sync up with Switch$_{P'}$. After that, the signals pass through the logic OR gates 501, 502 and the logic NOT gates 503, 504 to generate the CAI signals pertaining to the Interfering RD/WR_REQ signals in the k-th ICN associated with the (Master, Slave) Pair of Interest.

Figure 6:
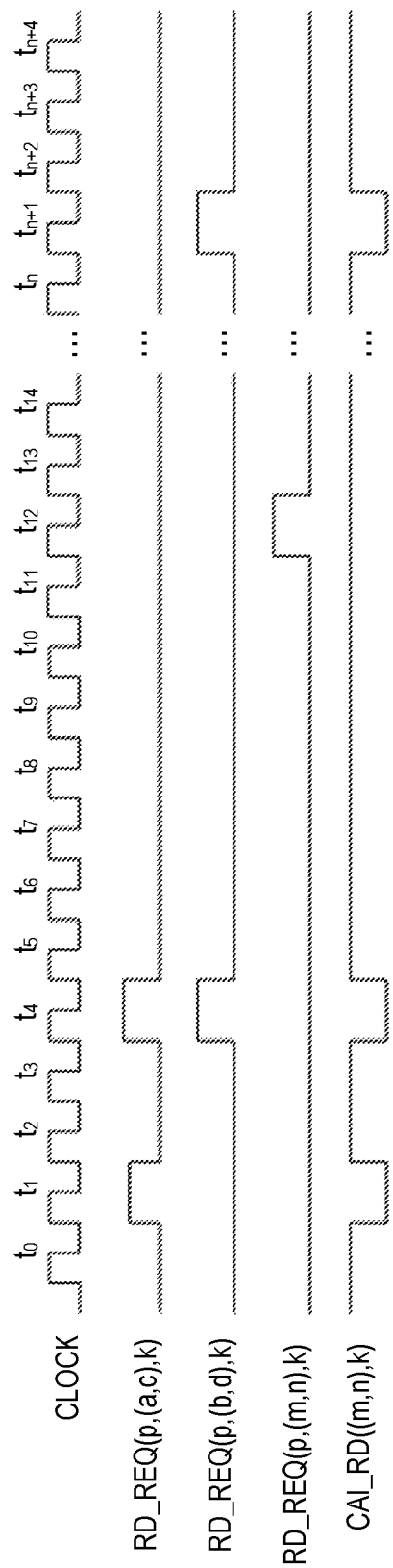
FIG. 6 illustrates signal waveforms pertaining to an exemplary operation of a Channel Performance Monitoring Unit.

FIG. 6 illustrates an example of how CAI signals would be generated by the CPMU 330 in response to receipt of a set of exemplary Read requests (RD_REQ). Generation of CAI signals in response to receipt of a set of Write requests (WR_REQ) would be performed by the CPMU 330 in a similar manner. In this non-limiting example, RD_REQ(p, (a,c),k) represents a Read request handled by the Switch$_p$ between a Master$_a$ and a Slave$_c$, and RD_REQ(p,(b,d),k) represents a Read request handled by the Switch, between a Master$_b$ and a Slave$_d$. Note that the exemplary RD_REQ(p, (m,n),k) signal, representing a Read request handled by the Switch, between a Master$_m$ and a Slave$_n$, is merely illustrated to demonstrate that Read (and Write) requests between the (Master, Slave) Pair of Interest are not considered (monitored) by the CPM for determining channel availability for the Master of Interest. Consequently, such Read and Write request signals between the (Master, Slave) Pair of Interest are not actually processed within the CPMU 330.

As can be seen in this example, the CPMU 330 will output a CAI signal in association with the (Master, Slave) Pair of Interest (i.e., (m, n)) residing in the k-th ICN (e.g., as a de-assertion of the CAI_RD((m,n),k) signal (due to the inversion by the logic NOT gate 503)). It can be further noticed from the example of FIG. 6, that any Read request between the (Master, Slave) Pair of Interest will not have any effect on the output of CAI signals from the CPMU 330.

FIG. 7 illustrates logic circuitry within a CPFU 740, which is representative of the CPFUs 140, 240. For the sake of simplicity, the example illustrated in FIG. 7 only shows the output of CAI signals generated from the processing of Interfering RD_REQ signals; however, the output of CA signals generated from the processing of Interfering WR_REQ signals would be performed by the CPFU 740 in a similar manner with similar circuitry. The CPFU 740 includes a logic AND gate 704, a channel availability counter ("CAC") 705, a comparator 707, a threshold register 706, and a latch 708. The CPFU 740 may also include signal-conditioning circuits 701 . . . 703 and a status register 709. The CPFU 740 receives inputs 770 from each CPMU (e.g., CPMU 130 of the ICN 101, CPMUs 230 . . . 232 of the ICNs 201 . . . 203), and its output 750 is control signals (i.e., the CA signals) fed back to each predetermined Master of Interest (e.g., Master$_m$ 104 in the SoC 100 of FIG. 1, Master$_m$ 214 . . . Master$_m$ 215 in the SoC 200 of FIG. 2).

The example illustrated in FIG. 7 represents processing with respect to the (Master, Slave) Pair of Interest, but the CPFU 740 is able to perform processing for multiple (Master, Slave) Pairs of Interest by implementing a similar circuit as shown in FIG. 7 for each such (Master, Slave) Pair of Interest.

The inputs 770 are the CAI_RD signals from each of the CPMUs that include switches within the Footprint (m, n) of Interest. Assume the k-th ICN is the last one in the pipeline (i.e., its input 770 has to travel the farthest relative to the inputs 770 from other ICNs). Since the relative transmission times of the various inputs 770 or known, delay circuits 701 . . . 703 can be implemented for each of the other inputs 770 from the 1 . . . k ICNs. After that, all signals pass through the logic AND gate 704 and then enter the CAC 705. As will be further described with respect to FIG. 8, the logic AND gate 704 functions to logically AND the received CAI_RD signals.

The CAC 705 may be optionally enabled by a CPFU_ENABLE signal, which can be configured by software (e.g., a software program running within a processor core in the integrated circuit (e.g., integrated circuit 100, integrated circuit 200). After enabled, the CAC 705 begins to count the number of clock cycles (e.g., as supplied by a reference clock (REF_CLK)) that its input signal is continuously asserted. As a result of the logic AND gate 704, any de-assertion of any of the CAI_RD((m,n),k) (k=1, 2, ... K) signals resets the CAC 705 to zero.

The threshold register 706 may be configured to store a threshold value pertaining to monitored Interfering RD_REQ and/or Interfering WR_REQ for each of the one or more (Master, Slave) Pairs of Interest. Additionally, in accordance with certain embodiments of the present disclosure, the threshold register 706 may be configured to store different threshold values dynamically based on different types of application even with respect to monitoring being performed for the same (Master, Slave) Pair of Interest. In the non-limiting example of FIG. 7, the threshold value (REG_CA_RD(m, n)) in the threshold register 706 pertains to the monitoring of Interfering RD_REQ signals pertaining to the Footprint (m, n) of Interest.

Figure 8:
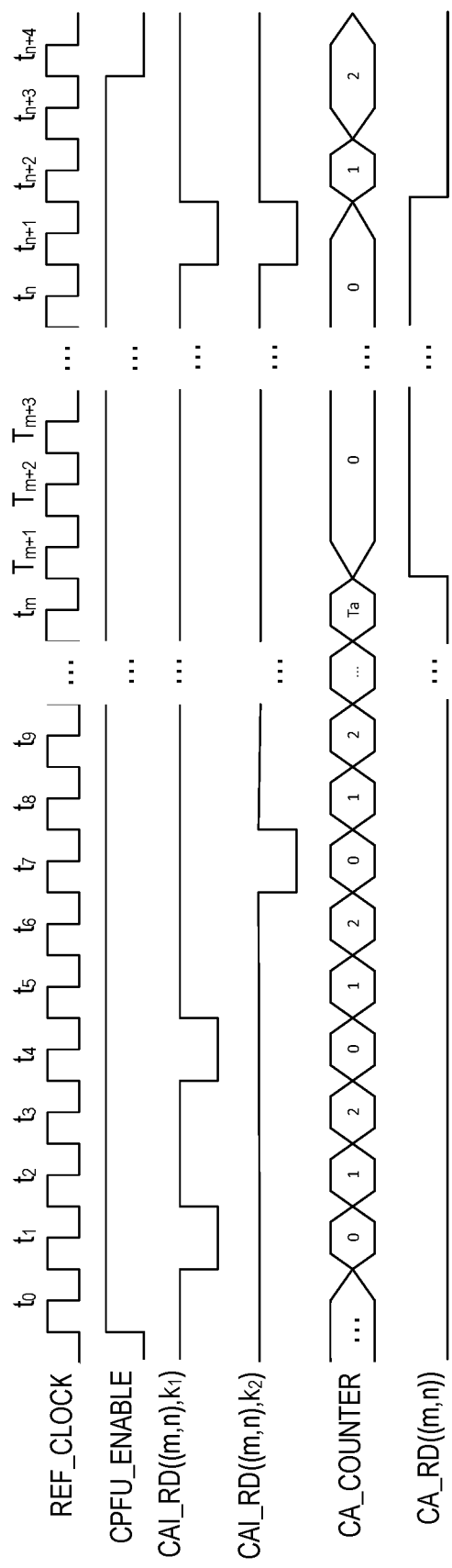
FIG. 8 illustrates signal waveforms pertaining to an exemplary operation of a Channel Performance Fusion Unit.

As will be further described with respect to FIG. 8, if the number of clock cycles counted by the CAC 705 exceeds the threshold value REG_CA_RD(m, n), the output signal from the CAC 705, CA_RD(m,n), is asserted and latched in the latch 708. CA_RD(m,n) 750 is de-asserted by any de-assertion of any of the CAI_RD((m,n),k) (k=1, 2, ... K) signals.

This CA_RD/WR(m,n) signal, which may be written into the n-th bit of the REG_CA_STATUS register 709 (which can be read by software), may be sent to the predetermined Master(s) of Interest as the output signal(s) 750. This CA_RD/WR(m,n) signal is also fed back to the CAC 705 to reset the counter to zero. The CPFU 740 may be configured to implement a REG_CA_STATUS register 709 for each Master of Interest, where each n-th bit corresponds to a different Slave to which the Master of Interest may be configured to perform a data transaction.

FIG. 8 illustrates signal waveforms representing a non-limiting exemplary operation of the CPFU 740 in accordance with embodiments of the present disclosure. The CAC 705 begins to count the number of REF_CLK clock cycles, as represented by the count CA_Counter. The count CA_Counter in the CAC 705 is reset to zero by receipt of any de-asserted CAI_RD((m, n),{k}) signal from a k-th CPMU.

When the count CA_Counter reaches the predetermined threshold value (Ta) as stored within the threshold register 706, the channel availability signal CA_RD(m,n) is asserted by the comparison of the count CA_Counter with the threshold value Ta by the comparator 707, and the count CA_Counter is reset to zero within the CAC 705. Thus, it can be readily observed by the signal waveforms represented in the exemplary operation illustrated in FIG. 8 that the CA_RD(m,n) signal is de-asserted by de-assertion of any of the CAI_RD((m, n),{k}) signals, and the count CA_Counter starts to count REF_CLK clock cycles again (and optionally until CPFU_ENABLE is de-asserted).

It can be thus readily appreciated that, for each (m,n)-th access path in an ICN, the respective CPMU monitors the Interfering RD/WR_REQ signals associated with all Interfering (Master, Slave) pairs from each switch within a Footprint (m, n) of Interest, unifies the clock, synchronizes the clustered signals, and combines them to generate a channel availability indicator ("CAI") signal pertaining to the (m,n)-th access path in the ICN. The CPFU collects each of the CAI signals from each ICN, and evaluates these signals to determine when an assertion of an aggregate combination of the signals has occurred for a predetermined amount of time, whereby it sends a channel availability signal (i.e., a CA_RD(m, n) or CA_WR(m, n) signal) to the Master(s) of Interest.

Note, that if the CPFU is not enabled, the integrated circuit may be configured so that the Master(s) of Interest initiate data transactions immediately, i.e., without any timing delay as described herein, which may have an adverse effect on the efficiency of the ICN as has been previously noted.

Figure 9:
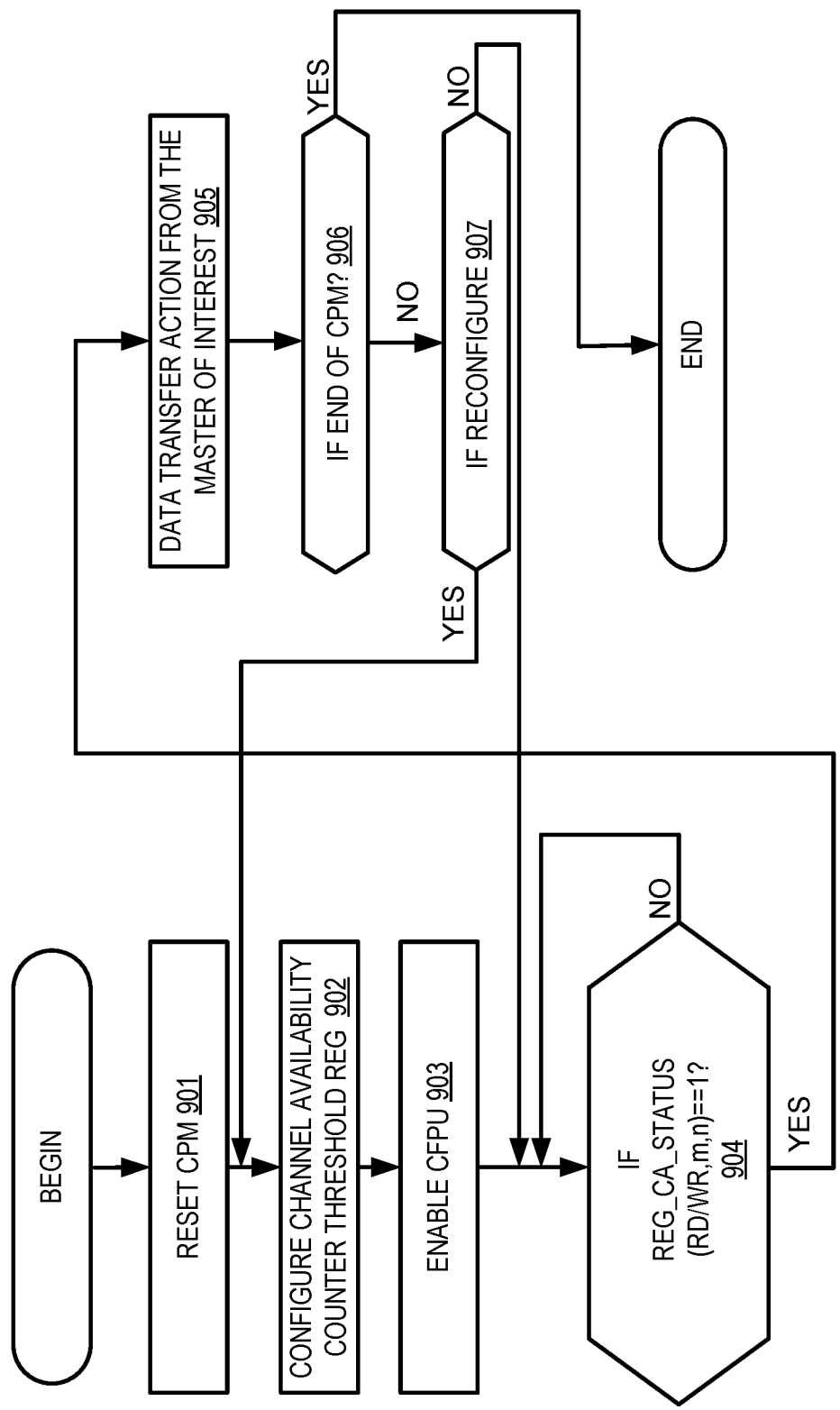
FIG. 9 illustrates a flow diagram of a configuration of a Channel Performance Monitor in accordance with embodiments of the present disclosure.

FIG. 9 illustrates a flow chart diagram of a process for configuring a CPM (e.g., the exemplary CPM of FIG. 1 composed of the CPMU 130 and the CPFU 140, or the exemplary CPM of FIG. 2 composed of the CPMUs 230 ... 232 and the CPFU 240) in accordance with certain embodiments of the present disclosure. For example, the process of FIG. 9 may be implemented within a host processor, DSP, or any programmable controllers/sequencers, etc. that can control the data transfer from a Master of Interest, including the Master itself.

The process block 901 represents an optional reset of the CPM. In the process block 902, the threshold register(s) 706 pertaining to each of the one or more (Master, Slave) Pairs of Interest are configured with predetermined threshold counts (Ta). In the process block 903, the CFPU may be enabled. The process block 904 represents a loop in which a value of the n-th bit of the REG_CA_STATUS register 709 is checked to determine if the Footprint (m, n) of Interest is available, and when it is (e.g., by the value being asserted as a logical 1), an initiation of a data transaction from the Master of Interest is performed by sending the channel availability signal 750. For example, a process performing in accordance with FIG. 9 may check the value of the n-th bit of the REG_CA_STATUS register 709 and if the bit has a value of "1" and there is a data transfer task in the queue within the Master of Interest, in the process block 905 the process will perform a data transfer from the Master of Interest to the pertinent Slave. In the process block 906, it is determined whether the channel performance monitoring for this particular (Master, Slave) Pair of Interest has completed (e.g., whether the CPM needs to be shut down or made inactive). If not, the process block 907 determines if need to configure for a different (Master, Slave) Pair(s) of Interest and/or a different threshold count value. If Yes, return to the process block 902. Otherwise, return to the process block 904 to enable another round of monitoring.

Note that the process blocks 904 and 905 can be implemented with a low-level driver, or implemented by hardware. When implemented by hardware, when the channel availability signal "CA_RD(m,n)" indicated in FIG. 7 is delivered to the Master(s) of Interest, such Master(s) may be implemented with any well-known software and/or hardware suitable for initiating one or more data transactions (Read or Write as the case may be) in response to the receipt of the channel availability signal.

Though embodiments of the present disclosure have been described with respect to a (Master, Slave) Pair of Interest involving data traffic between and an m-th Master and an n-th Slave, embodiments are also applicable to situations in which a particular (Master, Slave) Pair of Interest involves data traffic between multiple Masters and/or multiple Slaves.

Embodiments of the present disclosure have been described with an ICN configured with a static topology. A static topology interconnection network is one that does not change its connections once built, i.e., the connections implemented within each of the switches in an ICN for communicating the data traffic between the various (Master, Slave) pairs. In a dynamic, or reconfigurable, topology network, such connections can be changed by setting the appropriate switches. Accordingly, embodiments of the present disclosure may be applied to an ICN configured with a dynamic, or reconfigurable, topology.

Embodiments of the present disclosure have been described with a CPM implemented with a CPMU and a CPFU. However, depending upon the particular configuration of the SoC, and how many ICNs are implemented, embodiments of the present disclosure may be implemented without a CPMU, or with alternative logic circuitry, such as when a particular Footprint (m, n) of Interest within an ICN only passes through a single switch. Additionally, if there is only a need to provide channel availability information to a Master of Interest within a single ICN in a SoC, the functionality of the CPMU, or its equivalent, may be incorporated within a CPFU.

Aspects of the present disclosure provide an integrated circuit that includes a first Master and a second Master; a plurality of Slaves; an Interconnection Network ("ICN") coupled to the first Master, the second Master, and the plurality of Slaves, wherein the ICN includes a switch, wherein the ICN is configured to communicate data traffic between the first Master and a first Slave of the plurality of Slaves via the switch, and wherein the ICN is configured to communicate a set of data transactions between the second Master and one or more of the plurality of Slaves via the switch; and a Channel Performance Monitor ("CPM") configured to monitor a current activity level of the set of data transactions and send a channel availability signal to the first Master as a function of the monitoring of the current activity level of the set of data transactions. The first Master is configured to initiate a data transaction between the first Master and the first Slave only in response to receipt of the channel availability signal. The CPM may be configured to send the channel availability signal to the first Master a predetermined number of clock cycles after the switch has not transferred any of the set of data transactions. The switch may be hardwired to communicate data traffic between the first Master and the first Slave, and wherein the switch may be hardwired to communicate each of the set of data transactions between the second Master and the one or more of the plurality of Slaves. The channel performance monitor may be configured to perform a real-time monitoring of read/write requests handled by the switch that are associated with the set of data transactions. The channel performance monitor may be configured to not monitor read/write requests handled by the switch that are associated with data traffic between the first Master and the first Slave. The channel performance monitor may be configured to synchronize the monitored set of data transactions to a common clock domain and to send the channel availability signal to the first Master when the switch has not handled a read/write request associated with any of the set of data transactions for a predetermined amount of time. The first Master, the second Master, the plurality of Slaves, the ICN, and the CPM are implemented within the integrated circuit, wherein the first and second Masters and the plurality of Slaves are each IP blocks implemented within the integrated circuit, wherein the first and second Masters are suitable for initiating read/write requests to one or more of the Slaves that are suitable for responding to the read/write requests.

Aspects of the present disclosure provide an integrated circuit that includes a first Interconnection Network ("ICN") that includes a first plurality of switches; a second ICN including a second plurality of switches; a first Master and a second Master both coupled to the first ICN; a plurality of Slaves coupled to the second ICN, wherein the first ICN and the second ICN are configured to communicate data traffic between the first Master and a first Slave of the plurality of Slaves via one or more of the first plurality of switches and one or more of the second plurality of switches, and wherein the first ICN and the second ICN are configured to communicate a set of data transactions between the second Master and one or more of the plurality of Slaves via one or more of the first plurality of switches and one or more of the second plurality of switches; and a Channel Performance Monitor ("CPM") configured to perform a real-time monitoring of the set of data transactions and send a channel availability signal to the first Master as a function of the real-time monitoring of the second set of data transactions, wherein the first Master is configured to initiate a data transaction to the first Slave only in response to receipt of the channel availability signal. The first ICN, the second ICN, the first Master, the second Master, the plurality of Slaves, and the CPM may all be implemented within the integrated circuit. The switches may be hardwired to communicate the data transactions, wherein the CPM is configured to perform a real-time monitoring of read/write requests handled by the one or more of the first plurality of switches and the one or more of the second plurality of switches that are associated with the set of data transactions, wherein the CPM is configured to not monitor read/write requests handled by the one or more of the first plurality of switches and the one or more of the second plurality of switches that are associated with the data traffic between the first Master and the first Slave, wherein the CPM is configured to send the channel availability signal to the first Master when the one or more of the first plurality of switches and the one or more of the second plurality of switches that are associated with the set of data transactions have not handled a read/write request associated with any of the set of data transactions for a predetermined amount of time. The one or more of the first plurality of switches and the one or more of the second plurality of switches that communicate the data traffic between the first Master and the first Slave compose an access path, wherein at least one of the one or more of the first plurality of switches and at least one of the one or more of the second plurality of switches are configured to communicate one or more of the set of data transactions between the second Master and one or more of the plurality of Slaves, wherein the CPM is configured to monitor all read/write requests handled by those switches within the access path other than those read/write requests that are associated with the data traffic between the first Master and the first Slave. The CPM is configured to send the channel availability signal to the first Master when those switches within the access path that are associated with the set of data transactions have not handled a read/write request associated with any of the set of data transactions for a predetermined amount of time. The CPM may include a first channel performance monitoring unit ("CPMU") coupled to the first ICN and configured to monitor the read/write requests handled by those switches within the first plurality of switches that are within the access path, wherein the CPMU is further configured to output a first signal that represents an aggregate of a level of real-time activity of the read/write requests handled by those switches within the first plurality of switches that are within the access path; a second CPMU coupled to the second ICN and configured to monitor the read/write requests handled by those switches within the second plurality of switches that are within the access path, wherein the second CPMU is further configured to output a second signal that represents an aggregate of a level of real-time activity of the read/write requests handled by those switches within the second plurality of switches that are within the access path; and a CPFU configured to perform a logical AND operation on the first and second signals, and to output the channel availability signal to the first Master when a result of the logical AND operation indicates that there has been no read/write requests handled by those switches within the first plurality of switches and the second plurality of switches that are within the access path for a predetermined period of time. The first CPMU and the second CPMU may be each configured to synchronize the real-time monitored read/write requests into a common clock domain. The integrated circuit may further include one or more Slaves coupled to the first ICN, wherein the first ICN is configured to communicate one or more data transactions between either the first Master or the second Master and the one or more Slaves coupled to the first ICN.

Aspects of the present disclosure provide a method implemented within an integrated circuit that includes an Interconnection Network ("ICN") that includes switches each configured to communicate data traffic along predetermined access paths between Masters and Slaves coupled to the ICN, wherein a plurality of the switches are configured to communicate data traffic along a first predetermined access path between a first one of the Masters and a first one of the Slaves, and wherein a plurality of the switches are configured to communicate data traffic along other predetermined access paths between one or more of the Masters and one or more of the Slaves, wherein the other predetermined access paths are not the same as the first predetermined access path, and wherein the method includes monitoring a current activity level of data transfer requests handled by the plurality of switches associated with the other predetermined access paths; and controlling initiation of the data traffic along the first predetermined access path between the first one of the Masters and the first one of the Slaves as a function of the monitoring of the current activity level of the data transfer requests handled by the plurality of switches associated with the other predetermined access paths. The controlling the initiation of the data traffic along the first predetermined access path includes sending a channel availability signal to the first one of the Masters when no data transfer requests have been handled by the plurality of switches associated with the other predetermined access paths for a predetermined time period, wherein the first one of the Masters is configured to initiate data traffic along the first predetermined access path only in response to receipt of the channel availability signal. The monitoring of the current activity level of the data transfer requests handled by the plurality of switches associated with the other predetermined access paths includes not monitoring a current activity level of data transfer requests handled by the plurality of switches associated with the first predetermined access path. The switches associated with the first predetermined access path may be hardwired to communicate data traffic along the first predetermined access path between the first one of the Masters and the first one of the Slaves, and wherein the switches associated with the other predetermined access paths may be hardwired to communicate data traffic along the other predetermined access paths between one or more of the Masters and one or more of the Slaves.

A number of embodiments of the disclosure have been described. Nevertheless, it will be understood that various modifications may be made without departing from the spirit and scope of the present disclosure. Accordingly, other embodiments are within the scope of the following claims.

The instructions, states, and/or flowchart steps and paths in FIG. 9 can be executed in any order, unless a specific order is explicitly stated. Also, those skilled in the art will recognize that while one example set of instructions/states/paths has been discussed, the material in this specification can be combined in a variety of ways to yield other examples as well, and are to be understood within a context provided by this detailed description.

In some example embodiments, the various sets of instructions/states/paths described with respect to FIG. 9 may be implemented as functional and software instructions embodied as a set of executable instructions which are effected on a computer or machine which is programmed with and controlled by said executable instructions. For example, such instructions/states/paths may be loaded for execution on a controller or processor core within a SoC.

It will be appreciated that any components said to be coupled may be coupled or connected either directly or indirectly. In the case of indirect coupling, additional components may be located between the two components that are said to be coupled.

The singular forms "a," "an," and "the" include plural referents unless the context clearly dictates otherwise. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs or is suitable to perform the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke a 35 U.S.C. § 112, paragraph six interpretation for that unit/circuit/component.

What is claimed is:

1. An integrated circuit comprising:
a first Master and a second Master;
a plurality of Slaves;
an Interconnection Network ("ICN") coupled to the first Master, the second Master, and the plurality of Slaves, wherein the ICN comprises a plurality of switches, each switch being a switch type selected from a group consisting of a one-input multi-output switch, a multi-input one-output switch, or a multi-input multi-output switch, wherein the ICN is configured to communicate data traffic between the first Master and a first Slave of the plurality of Slaves via an access path composed by at least two switches of the plurality of the switches, and wherein the ICN is configured to communicate a set of data transactions between the second Master and one or more of the plurality of Slaves via each switch of the at least two switches; and a Channel Performance Monitor ("CPM") configured to monitor a current activity level of the set of data transactions associated with the at least two switches and send a channel availability signal to the first Master as a function of the monitoring of the current activity level of the set of data transactions, wherein the CPM is configured to monitor read/write requests handled by those switches within the access path other than those read/write requests that are associated with the data traffic between the first Master and the first Slave.

2. The integrated circuit as recited in claim 1, wherein the first Master is configured to initiate a data transaction between the first Master and the first Slave only in response to receipt of the channel availability signal.

3. The integrated circuit as recited in claim 2, wherein the CPM is configured to send the channel availability signal to the first Master a predetermined number of clock cycles after at least two switches of the plurality of the switches have not transferred any of the set of data transactions.

4. The integrated circuit as recited in claim 3, wherein the at least two switches of the plurality of switches are hardwired to communicate data traffic between the first Master and the first Slave, and wherein each switch of the at least two switches is hardwired to communicate each of the set of data transactions between the second Master and the one or more of the plurality of Slaves.

5. The integrated circuit as recited in claim 3, wherein the channel performance monitor is configured to perform a real-time monitoring of read/write requests handled by the at least two switches that are associated with the set of data transactions.

6. The integrated circuit as recited in claim 5, wherein the channel performance monitor is configured to not monitor read/write requests handled by the at least two switches that are associated with data traffic between the first Master and the first Slave.

7. The integrated circuit as recited in claim 1, wherein the channel performance monitor is configured to synchronize the monitored set of data transactions to a common clock domain and to send the channel availability signal to the first Master when the at least two switches have not handled a read/write request associated with any of the set of data transactions for a predetermined amount of time.

8. The integrated circuit as recited in claim 1, wherein the first Master, the second Master, the plurality of Slaves, the ICN, and the CPM are implemented within the integrated circuit, wherein the first and second Masters and the plurality of Slaves are each IP blocks implemented within the integrated circuit, wherein the first and second Masters are suitable for initiating read/write requests to one or more of the Slaves that are suitable for responding to the read/write requests.

9. An integrated circuit comprising:
a first Interconnection Network ("ICN") comprising a first plurality of switches;
a second ICN comprising a second plurality of switches;
a first Master and a second Master both coupled to the first ICN;
a plurality of Slaves coupled to the second ICN, wherein the first ICN and the second ICN are configured to communicate data traffic between the first Master and a first Slave of the plurality of Slaves via one or more of the first plurality of switches and one or more of the second plurality of switches, and wherein the first ICN and the second ICN are configured to communicate a set of data transactions between the second Master and one or more of the plurality of Slaves via one or more of the first plurality of switches and one or more of the second plurality of switches; and a Channel Performance Monitor ("CPM") configured to perform a real-time monitoring of the set of data transactions and send a channel availability signal to the first Master as a function of the real-time monitoring of the second set of data transactions, wherein the first Master is configured to initiate a data transaction to the first Slave only in response to receipt of the channel availability signal, wherein the one or more of the first plurality of switches and the one or more of the second plurality of switches that communicate the data traffic between the first Master and the first Slave compose an access path, wherein at least one of the one or more of the first plurality of switches and at least one of the one or more of the second plurality of switches are configured to communicate one or more of the set of data transactions between the second Master and one or more of the plurality of Slaves, wherein the CPM is configured to monitor all read/write requests handled by those switches within the access path other than those read/write requests that are associated with the data traffic between the first Master and the first Slave.

10. The integrated circuit as recited in claim 9, wherein the first ICN, the second ICN, the first Master, the second Master, the plurality of Slaves, and the CPM are all implemented within the integrated circuit.

11. The integrated circuit as recited in claim 10, wherein the switches are hardwired to communicate the data transactions, wherein the CPM is configured to perform a real-time monitoring of read/write requests handled by the one or more of the first plurality of switches and the one or more of the second plurality of switches that are associated with the set of data transactions, wherein the CPM is configured to not monitor read/write requests handled by the one or more of the first plurality of switches and the one or more of the second plurality of switches that are associated with the data traffic between the first Master and the first Slave, wherein the CPM is configured to send the channel availability signal to the first Master when the one or more of the first plurality of switches and the one or more of the second plurality of switches that are associated with the set of data transactions have not handled a read/write request associated with any of the set of data transactions for a predetermined amount of time.

12. The integrated circuit as recited in claim 9, wherein the CPM is configured to send the channel availability signal to the first Master when those switches within the access path that are associated with the set of data transactions have not handled a read/write request associated with any of the set of data transactions for a predetermined amount of time.

13. The integrated circuit as recited in claim 12, wherein the CPM comprises:
a first channel performance monitoring unit ("CPMU") coupled to the first ICN and configured to monitor the read/write requests handled by those switches within the first plurality of switches that are within the access path, wherein the CPMU is further configured to output a first signal that represents an aggregate of a level of real-time activity of the read/write requests handled by those switches within the first plurality of switches that are within the access path;

a second CPMU coupled to the second ICN and configured to monitor the read/write requests handled by those switches within the second plurality of switches that are within the access path, wherein the second CPMU is further configured to output a second signal that represents an aggregate of a level of real-time activity of the read/write requests handled by those switches within the second plurality of switches that are within the access path; and a channel performance fusion unit ("CPFU") configured to perform a logical AND operation on the first and second signals, and to output the channel availability signal to the first Master when a result of the logical AND operation indicates that there has been no read/write requests handled by those switches within the first plurality of switches and the second plurality of switches that are within the access path for a predetermined period of time.

14. The integrated circuit as recited in claim 13, wherein the first CPMU and the second CPMU are each configured to synchronize the real-time monitored read/write requests into a common clock domain.

15. The integrated circuit as recited in claim 9, further comprising one or more Slaves coupled to the first ICN, wherein the first ICN is configured to communicate one or more data transactions between either the first Master or the second Master and the one or more Slaves coupled to the first ICN.

16. A method implemented within an integrated circuit that comprises an Interconnection Network ("ICN") comprising switches each configured to communicate data traffic along predetermined access paths between Masters and Slaves coupled to the ICN, wherein a plurality of the switches are configured to communicate data traffic along a first predetermined access path between a first one of the Masters and a first one of the Slaves, and wherein each switch of the plurality of the switches is configured to communicate data traffic along other predetermined access paths between one or more of the Masters and one or more of the Slaves, wherein the other predetermined access paths are not the same as the first predetermined access path, the method comprising:

monitoring a current activity level of data transfer requests handled by each of the plurality of switches associated with the other predetermined access paths; and controlling initiation of the data traffic along the first predetermined access path between the first one of the Masters and the first one of the Slaves as a function of the monitoring of the current activity level of the data transfer requests handled by the plurality of switches associated with the other predetermined access paths, wherein the monitoring the current activity level further comprises:

monitoring read/write requests handled by those switches in the first predetermined access path other than those read/write requests that are associated with the data traffic between the first one of the Masters and the first one of the Slaves.

17. The method as recited in claim 16, wherein the controlling the initiation of the data traffic along the first predetermined access path comprises sending a channel availability signal to the first one of the Masters when no data transfer requests have been handled by the plurality of switches associated with the other predetermined access paths for a predetermined time period, wherein the first one of the Masters is configured to initiate data traffic along the first predetermined access path only in response to receipt of the channel availability signal.

18. The method as recited in claim 17, wherein the monitoring of the current activity level of the data transfer requests handled by the plurality of switches associated with the other predetermined access paths comprises not monitoring a current activity level of data transfer requests handled by the plurality of switches associated with the first predetermined access path.

19. The method as recited in claim 18, wherein the switches associated with the first predetermined access path are hardwired to communicate data traffic along the first predetermined access path between the first one of the Masters and the first one of the Slaves, and wherein the switches associated with the other predetermined access paths are hardwired to communicate data traffic along the other predetermined access paths between one or more of the Masters and one or more of the Slaves.

* * * * *